Oct. 3, 1967   J. L. NAGLE   3,345,088
HOSE COUPLING

Filed March 19, 1965   2 Sheets-Sheet 1

INVENTOR:
JOSEPH L. NAGLE
BY *Gravely, Lieder & Woodruff*
HIS ATTORNEYS

United States Patent Office 3,345,088
Patented Oct. 3, 1967

3,345,088
HOSE COUPLING
Joseph L. Nagle, 4946 Tieman Ave.,
St. Louis, Mo. 63123
Filed Mar. 19, 1965, Ser. No. 441,058
5 Claims. (Cl. 285—39)

ABSTRACT OF THE DISCLOSURE

A hose coupling having a tapered plug on the end of a hose which is designed to fit vertically in a horizontally extending socket and be held in leakproof relation by a key having an inclined wall.

Figure 1:
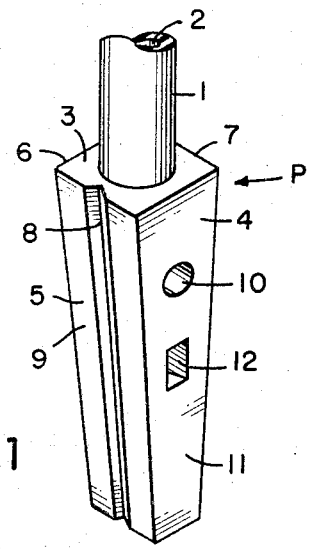

This invention relates to an improved hose coupling, and more particularly, to an improved hose coupling for use with washing machines wherein the water inlets may be close to a wall or other obstructions.

At present, ordinary rubber hose with metal connectors having internal threads are used to connect the hot and cold water inlets of automatic washing machines to the source of hot and cold water. Since these inlets are usually positioned at the rear of the washing machine and near the floor, and since the washing machine is usually positioned with its back panel as close to the wall as possible, it becomes difficult to make the connection between the two hose and the two washing machine inlets, which have external threads. At present, rubber hose with metal connectors are used. Where the space is very small, the metal connector may be provided with an extension which extends at right angles to the hose, since the rubber hose material cannot be bent too sharply without weakening or rupturing it. Also, the cold water connection is usually grounded so that the cold water hose with its ground wire is different from hot water hose. This requires a parts supplier to carry four different kinds of hose. Present washing machine inlets are frequently made from plastic material whose threads wear out if hose are screwed onto or unscrewed from the inlets very often. Since hose wear out periodically, it is impossible to avoid replacing them. This frequently results in the threads being stripped on the water inlets, which are attached to the expensive thermostatic control valves mounted within the washing machine.

A principal object of the present invention is to provide a new hose coupling which does not have threads, and wherein the fitting or plug is perpendicular to the inlet or socket which receives the plug, thereby avoiding any bending of the hose which usually extends upwardly and about parallel to the rear panel of the washing machine. Another object is to provide a molded one-piece fitting or plug which is integral with the hose, thereby avoiding the possibility of leakage between the rubber hose material and the metallic band, extension, and connector usually required to fasten a hose to the threads of an inlet. Another object is to provide a hose coupling which can be attached with ease in a small space behind a washing machine. This space is frequently of the order of four to six inches. Another object is to provide a hose coupling which will reduce the number of types of couplings required to be kept in stock by a parts supplier.

These and other objects and advantages will become apparent hereinafter.

The present invention is embodied in a hose coupling comprising a plug, a socket, and a key, said plug being connected to one end of a hose and having a water passage therein and a plurality of sloping walls, a key opening in said plug below said water passage, said plug being adapted to be inserted in a socket of corresponding shape and secured thereby by means of a tapered key extending into said key opening in wedging relation.

Figure 2:
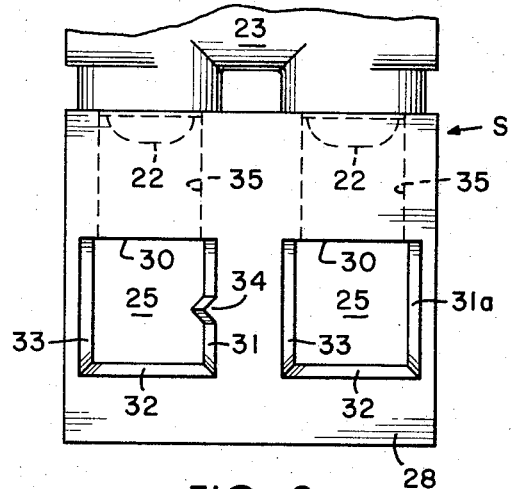
Figure 4:
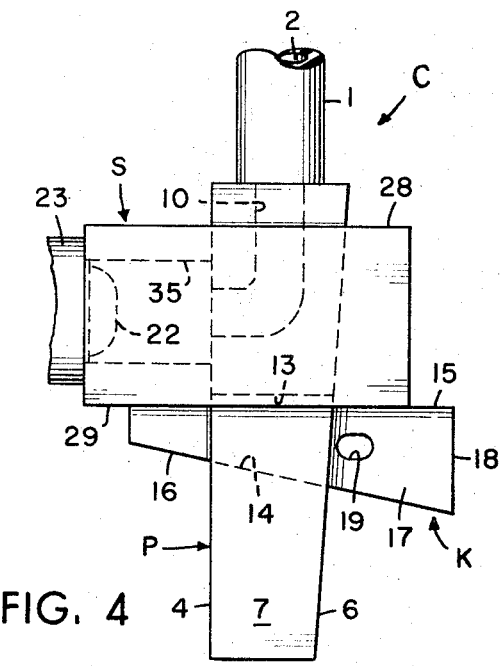
Figure 3:
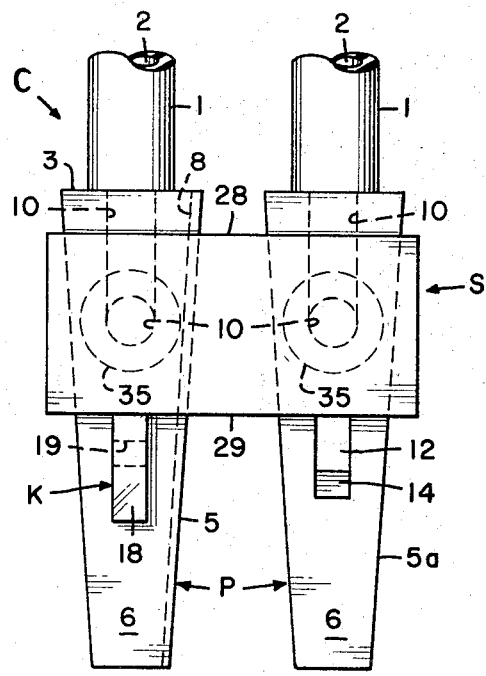
Figure 5:
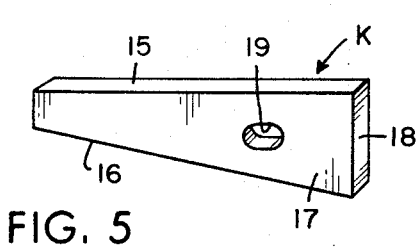
Figure 6:
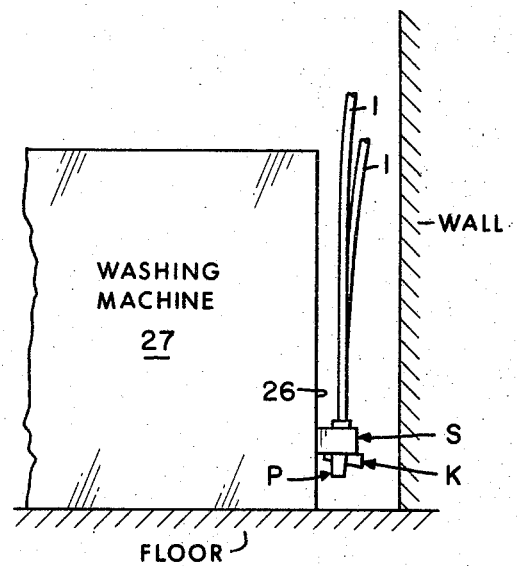
Figure 7:
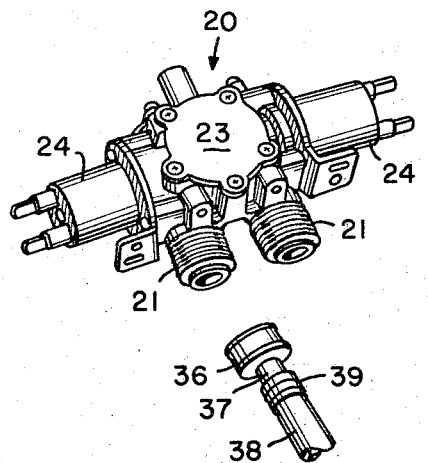

The invention also consists in the parts and in the arrangements and combinations of parts hereinafter described and claimed. In the accompanying drawings which form part of this specification and wherein like numerals and symbols refer to like parts wherever they occur:

FIG. 1 is a perspective view of a hose coupling embodying the present invention, FIG. 2 is a top plan view of the socket without the hose therein, FIG. 3 is a side view showing two hose and plugs positioned in the socket which contains the hot and cold water inlets, the right plug shown without the key therein, FIG. 4 is an end view thereof, FIG. 5 is a perspective view of a key, FIG. 6 is a view showing a washing machine whose back panel is positioned near a wall and showing the hose coupling with the hoses in vertical relationship, and FIG. 7 is a fragmentary exploded view showing the present plastic inlets and the hose connection in present use.

Referring now to the drawings in detail, it will be seen that the invention which has been illustrated is embodied in a hose coupling C having a plug P, a socket S, and a key K. As illustrated in FIG. 6, two hose couplings C are joined together in a socket S which extends beyond the rear wall of a washing machine positioned on a floor in close proximity to a wall.

The plug P is connected to the end of a hose 1 having a water passage 2 therein. The plug P is preferably made from the same material as the hose 1, which may be a rubber or plastic composition suitable for use as a hose. The male plug P is tapered and has a small top wall 3, a vertical side wall 4, and three other tapered or sloping side walls 5, 6 and 7. One of the sloping side walls 5 has orienting means or a notch 8 therein for identifying either the cold or hot water and to prevent the hot water hose from being connected to the cold water inlet, or vice versa. Care must be taken to connect the cold water hose to the cold water inlet, since the cold water hose usually contains a ground wire to ground the washing machine which contains certain electrical parts. The plug P has an upper portion 9 with a water passage 10 therein, and a lower portion 11 with a key opening 12 therein which extends entirely through the plug P between two walls thereof, such as between the walls 4 and 6. The key opening 12 has a top surface 13 and a sloping or inclined lower surface 14.

The key opening 12 is adapted to receive the key K which has a flat top surface 15 and a sloping lower surface 16. The key K is dimensioned so that a rear portion 17 always remains exposed. The rear portion 17 has a rear hammering surface 18 with an opening or recess 19 inwardly thereof to aid in removing the key K from its wedging relation within the plug opening 12 when the parts are assembled in their leakproof relationship. In this position, the key K is wedged between the lower surface 14 of the key opening 12 and the bottom of the socket S.

As shown in FIG. 7, present washing machines frequently have inlets 20 made from plastic material with two threaded connectors 21 each having an inside diameter of about three-fourths of an inch, which are adapted to receive the small circular screening members 22 which screen the incoming hot and cold water. The exposed threads 21 are delciate and frequently are stripped when workmen assemble the present metallic connectors 21 thereto from awkward and low positions in the small space behind the washing machine. The threaded connectors 21 are part of a central inlet section 23 having expensive thermostatic control valves 24 secured thereto.

The sockets S have openings 25 which eliminate any threads and are in the form of a rectangular block made of plastic or rubber or other suitable material which extends outwardly from the rear panel 26 of the washing machine 27 in place of the two threaded plastic connectors 21. This plastic block or socket S has an upper surface 28, a lower surface 29 and contains the tapered female socket opening 25, one opening being for cold water and the other for hot water. Each socket opening 25 has a vertical surface 30 parallel to and closest to the rear wall 26 of the washing machine 27. In addition, each socket opening 25 has three sloping surfaces 31, 32 and 33 which are adapted to receive the corresponding sloping walls 5, 6, and 7 of the plug P. One of said socket openings 25 has a projection 34 for receiving the registering notch 8 on one of the hose couplings C. Thus, an unnotched plug P cannot be inserted into the socket opening 25 with the projection 34 therein. This prevents the hot water hose from being connected to the cold water inlet, or vice versa. A water passage 35 extends from each socket opening 25 inwardly into the washing machine 27.

FIGS. 3 and 4 show the plug P in assembled relation with the socket S and the key K wedged therein to maintain the parts in assembled relation to form the hose coupling C.

To attach the two hose 1 to the washing machine 27, the plugs P are merely inserted downwardly into the socket openings 25 and the tapered keys K are inserted through the key openings 12 and pushed or struck on their rear surfaces 18 with a hammer or some object to cause the keys K to move horizontally and wedge the plugs P downwardly. This is due to the inclined lower surface 16 of the key K moving the sloping lower surface 14 of the plug opening 12 downwardly while the flat top surface 15 of the key K is in contacting relation with the bottom 29 of the socket S. The surfaces 14 and 16 preferably slope at angles of about 2 and 3 degrees, respectively, so as to provide a good wedging action and to prevent the key K from becoming disengaged due to any vibration, shrinkage of material over a period of time or any other reason. Thus, a leakproof connection has been made without the necessity of threads. The vertical rear wall 4 of the plug P against the vertical rear wall 30 of the socket S provides a close fit which remains leakproof when normal rubber or plastic materials are used. This is due to the forcing down of the plug P into the socket S, which causes the sloping walls 6 and 32 to move the vertical walls 4 and 30 into close contacting relation to form a leakproof connection between the water passages 10 and 35. In some instances, it might be desirable to have all of the plug walls and all of the socket walls sloping or tapered. Regardless of which walls slope, the key opening 12 may be positioned as shown, wherein the key K is inserted in plug wall 6, or it may be inserted in another accessible plug wall. As shown in the right socket opening 25 in FIGS. 2 and 3, the right socket wall 31a and the right plug wall 5a are not provided with a notch or projection in order to distinguish them from the left plug and left socket opening.

When the parts are in their assembled relation, water is free to move from the water passage 2 in the hose 1 into the curved water passage 10 in the plug P and then into the water passage 35 in the socket S. The only place where a leak can occur is at the inner wall 4, but this is prevented by the fact that the plug P is pulled downwardly in the socket S with great force due to the wedging action of the key K, thereby moving the plug wall 4 into leakproof relation with the socket wall 30. The fact that both the plug P and socket S are made from plastic or rubber material, which material itself is used as a seal, also helps prevent any leakage. The parts are so dimensioned that in their assembled position, the passage 10 line up with the passage 35.

As best shown in FIG. 6, the hose coupling C is simple to install and the upstanding hose 1 need not be bent at right angles or at sharp angles near the water inlets 20 to the washing machine. In the past, the connections were made by securing hot and cold water hose to the threads 21 by means of an internally threaded metal connector 36 which is free to rotate about a metal extension 37 which fits inside of a hose 38 having a metal band 39 around the outside thereof. Obviously, this required either the bending of the hose 38 to connect the horizontal inlet 20 with the water source thereabove, or the use of a metal extension 37 which was bent at right angles. The present invention avoids this, and once adopted, requires a parts supplier to carry only two hose, one for hot water and one for cold water. The supplier will no longer have to carry four hose, two cold water and two hot water, one of which each has a straight extension 37 and one of which has a right angle extension 37.

This invention is intended to cover all changes and modifications of the example of the invention herein chosen for purposes of the disclosure, which do not constitute departures from the spirit and scope of the invention.

What is claimed is:

1. A hose coupling comprising a tapered integral plug on the end of a hose, said plug having a water passage therethrough connecting with and in alignment with the water passage in said hose, the water passage in said plug being parallel to the longitudinal axis of said plug and having a laterally extending portion which extends to one wall of said plug, and therethrough, a socket having a tapered opening therein complementary to said tapered plug for receiving said plug, said socket having a horizontal water passage therein sealingly connecting with the laterally extending portion of the water passage in said plug, and a tapered key mounted in a tapered opening in said plug beneath said socket for maintaining the plug and the socket in leakproof assembled relation.

2. A hose coupling comprising a plug, a socket for receiving said plug, and a key for maintaining the plug in leakproof assembled relation with said socket, said plug being connected to one end of a hose having a water passage therethrough, said plug having a plurality of side walls, said plug having a vertical water passage therein which connects with said hose water passage and extends laterally to and through one of said walls, said walls being sloping, a key opening in said plug and removed from said vertical and laterally extending water passages extending between two opposing walls, said key opening having a top wall and an inclined lower wall and being adapted to receive a tapered key in wedging relation with said socket to thereby maintain said plug and socket in sealed relationship, said socket having a socket opening therethrough for receiving said plug, said socket opening having a plurality of sloping side walls corresponding in number to the sloping side walls of said plug, said socket having a horizontal water passage therein extending to said plug and adapted to connect with the lateral portion of the water passage therein, said key having a horizontal top wall and a sloping lower wall, said key having a portion thereof which remains out of the key opening after said key is in assembled relation in said key opening.

3. A hose coupling comprising a plug, a socket for receiving said plug, and a key for maintaining the plug in leakproof assembled relation with said socket, said plug being integrally connected to one end of a hose having a water passage therethrough, said plug having a plurality of side walls, one of said side walls being substantially vertical, said plug having a vertical water passage therein which connects with said hose water passage and extends laterally to and through said substantially vertical wall, all of said other walls being sloping, a key opening in said plug extending entirely therethrough between two of said walls thereof and removed from said vertical and laterally extending water passages, said key opening having a horizontal top wall and an inclined lower wall and being adapted to receive a tapered key in wedging relation with said socket to thereby maintain said socket and plug in sealed relationship, said socket having a socket opening therethrough for receiving said plug, said socket opening having one substantially vertical wall and a plurality of sloping side walls corresponding in number to the sloping side walls of said plug, said socket having a horizontal water passage therein extending to and through said substantially vertical wall and adapted to connect with the lateral portion of the water passage in said plug, said key having a horizontal top wall and a sloping lower wall, said key having means therein which remain exposed and out of the key opening after said key is in assembled relation in said key opening.

4. A hose coupling comprising a tapered plug, a tapered socket for receiving said plug, and a tapered key for maintaining the plug in leakproof assembled relation with said socket, said plug being integrally connected to one end of a hose having a water passage therethrough, said plug having four side walls, one of said side walls being substantially vertical, said plug having a vertical water passage therein which connects with said hose water passage and extends laterally to and through said substantially vertical wall, the other three of said walls being sloping to form said tapered plug, a key opening in said plug extending entirely therethrough between two of said walls thereof and removed from said vertical and laterally extending water passages, said key opening having a horizontal top wall and an inclined lower wall and being adapted to receive a tapered key in wedging relation, said socket having a socket opening therethrough for receiving said plug, said socket opening having one substantially vertical wall and three sloping side walls which cooperate with the three sloping side walls of said plug, said socket having a horizontal water passage therein extending to and through said substantially vertical wall and adapted to connect with the lateral portion of the water passage in said plug, said key having a horizontal top wall and an inclined lower wall, the horizontal top wall of said key adapted to contact the bottom of said socket and the inclined lower wall of the key adapted to contact the inclined lower wall of said plug thereby maintaining said plug and socket in leakproof relationship, said key having a rear abutment surface which remains exposed and out of the key opening after said key is in assembled relation in said key opening, and said key having an opening therein adapted to be grasped when removing said key from said key opening.

5. The combination set forth in claim 1 wherein said socket is provided with two separate socket openings adapted to receive two separate tapered plugs connected to the ends of two separate hoses, one cooperating plug and socket opening being provided with a registering projection and not to distinguish said pair from the other cooperating plug and socket opening.

References Cited

UNITED STATES PATENTS

| | | | |
|---|---|---|---|
| 792,074 | 6/1905 | Rathburn | 285—325 X |
| 913,892 | 3/1909 | Holmes | 285—421 X |
| 936,886 | 10/1909 | Hannold | 285—90 X |
| 959,854 | 5/1910 | Grierson | 285—325 |
| 1,327,144 | 1/1920 | Carr | 285—421 X |
| 1,641,839 | 9/1927 | Cain et al. | 285—421 X |
| 1,752,631 | 4/1930 | Campbell | 285—132 X |
| 1,842,897 | 1/1932 | Culp. | |
| 1,891,670 | 12/1932 | Ernst | 285—332.4 X |
| 2,038,477 | 4/1936 | Collins | 285—180 X |
| 2,689,611 | 9/1954 | Martinson | 285—179 X |
| 2,993,677 | 7/1961 | Ford | 285—332.1 X |

FOREIGN PATENTS 310,913    5/1929    Great Britain.

CARL W. TOMLIN, *Primary Examiner.*

D. W. AROLA, *Assistant Examiner.*

UNITED STATES PATENT OFFICE
CERTIFICATE OF CORRECTION

Patent No. 3,345,088                      October 3, 1967

Joseph L. Nagle

It is hereby certified that error appears in the above numbered patent requiring correction and that the said Letters Patent should read as corrected below.

Column 2, line 1, for "thereby" read -- therein --; column 3, line 74, for "line" read -- lines --; column 4, line 31, after "tapered", first occurrence, insert -- socket --; column 6, line 16, for "not" read -- notch --.

Signed and sealed this 22nd day of October 1968.

(SEAL)
Attest:

Edward M. Fletcher, Jr.                      EDWARD J. BRENNER
Attesting Officer                              Commissioner of Patents